United States Patent
Wagner et al.

(10) Patent No.: US 9,496,670 B2
(45) Date of Patent: Nov. 15, 2016

(54) ULTRASOUND WELDING DEVICE AND METHOD FOR WELDING ELECTRICAL CONDUCTORS

(71) Applicant: SCHUNK SONOSYSTEMS GMBH, Wettenberg (DE)

(72) Inventors: Peter Wagner, Wettenberg (DE); Dieter Stroh, Wettenberg (DE); Sinan Koc, Mucke (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 14/441,899

(22) PCT Filed: Dec. 3, 2013

(86) PCT No.: PCT/EP2013/075295
§ 371 (c)(1),
(2) Date: May 11, 2015

(87) PCT Pub. No.: WO2014/086733
PCT Pub. Date: Jun. 12, 2014

(65) Prior Publication Data
US 2015/0288123 A1 Oct. 8, 2015

(30) Foreign Application Priority Data
Dec. 3, 2012 (DE) .......................... 10 2012 111 734

(51) Int. Cl.
*B23K 1/06* (2006.01)
*H01R 43/02* (2006.01)
*B23K 20/10* (2006.01)
(Continued)

(52) U.S. Cl.
CPC ............ *H01R 43/0207* (2013.01); *B06B 3/00* (2013.01); *B23K 20/002* (2013.01); *B23K 20/106* (2013.01); *H01R 4/02* (2013.01);
(Continued)

(58) Field of Classification Search
None
See application file for complete search history.

(56) References Cited

U.S. PATENT DOCUMENTS 3,814,656 A * 6/1974 Hanson et al. ..... B29C 33/3857
156/580.2
4,256,529 A * 3/1981 Clarke .................... B29C 65/08
156/515
(Continued)

FOREIGN PATENT DOCUMENTS

DE 3316873 A1 * 11/1984 .......... B23K 20/106
DE 3508122 C2 9/1986
(Continued)

OTHER PUBLICATIONS

International Search Report mailed Jun. 12, 2014, corresponding to International Application No. PCT/EP2013/075295.

*Primary Examiner* — Kiley Stoner
(74) *Attorney, Agent, or Firm* — Ladas & Parry LLP (57) ABSTRACT

The invention relates to an ultrasound welding device for welding electrical conductors to produce a node between the conductors, comprising a compression space for receiving the conductors, which is delimited peripherally by two working surfaces delimiting the compression space on opposing sides and two lateral delimitation surfaces running transversely to the working surfaces, and the remaining sides are open. One of the working surfaces is a portion of a sonotrode, excitable in ultrasound oscillation, for the ultrasound welding device and the other working surface is a portion of a counterelectrode and at least the working surfaces are structured.

12 Claims, 6 Drawing Sheets

(51) Int. Cl.
*H01R 4/02* (2006.01)
*B06B 3/00* (2006.01)
*B23K 20/00* (2006.01)

(52) U.S. Cl.
CPC ............ *H01R 4/021* (2013.01); *H01R 4/029* (2013.01); *H01R 43/0263* (2013.01); *B23K 2201/32* (2013.01)

(56) References Cited

U.S. PATENT DOCUMENTS

| | | | | |
|---|---|---|---|---|
| 4,596,352 | A | | 6/1986 | Knapp |
| 4,624,809 | A | * | 11/1986 | Iimura .................... A44B 19/36 156/261 |
| 4,736,881 | A | * | 4/1988 | Niebuhr ............... B23K 20/106 228/1.1 |
| 4,769,095 | A | * | 9/1988 | Sager ...................... B29C 65/08 156/267 |
| 5,238,170 | A | * | 8/1993 | Nuss ..................... B23K 20/10 156/580.2 |
| 5,603,444 | A | * | 2/1997 | Sato ..................... B23K 20/106 228/1.1 |
| 5,976,315 | A | * | 11/1999 | Martin .................... B29C 65/08 156/580.1 |
| 7,337,938 | B2 | * | 3/2008 | Noro .................... B23K 20/106 156/580.1 |
| 2004/0020580 | A1 | * | 2/2004 | Oishi .................... B23K 20/106 156/73.1 |
| 2004/0031554 | A1 | * | 2/2004 | Moglich ................. B29C 65/08 156/73.1 |
| 2004/0065415 | A1 | * | 4/2004 | Sato ...................... B23K 20/10 156/580.1 |
| 2004/0216829 | A1 | * | 11/2004 | Gordon, Jr. ............. B23K 20/10 156/64 |
| 2005/0167054 | A1 | * | 8/2005 | Morschner ............. B23K 20/10 156/580.1 |
| 2005/0199676 | A1 | * | 9/2005 | Stroh .................... B23K 20/106 228/1.1 |
| 2006/0124690 | A1 | * | 6/2006 | Dobernecker ......... B23K 20/10 228/1.1 |
| 2006/0169388 | A1 | | 8/2006 | Shimizu et al. |
| 2006/0231585 | A1 | * | 10/2006 | Dieterle ............... B23K 20/106 228/101 |
| 2009/0013786 | A1 | * | 1/2009 | Gassert ................... B29C 65/08 73/579 |
| 2009/0200358 | A1 | * | 8/2009 | Violleau ........... B29C 66/00441 228/110.1 |
| 2009/0314412 | A1 | * | 12/2009 | Gabler ................... B23K 20/10 156/64 |
| 2010/0307660 | A1 | * | 12/2010 | Moeglich ............... B26D 7/086 156/73.4 |
| 2011/0166494 | A1 | * | 7/2011 | Calvez ................... A61F 2/0063 604/8 |
| 2012/0012258 | A1 | * | 1/2012 | Vogler ................. B29C 65/087 156/510 |
| 2012/0298645 | A1 | * | 11/2012 | Kleespiess ............. H01R 4/029 219/137 R |
| 2013/0062397 | A1 | * | 3/2013 | Stroh .................... B23K 20/106 228/110.1 |
| 2013/0139955 | A1 | * | 6/2013 | Regenberg ........... B23K 20/106 156/73.1 |
| 2014/0311797 | A1 | * | 10/2014 | Numata .................. H02G 1/14 174/75 R |
| 2014/0311798 | A1 | * | 10/2014 | Numata ................. H02G 15/06 174/75 R |

FOREIGN PATENT DOCUMENTS

| | | |
|---|---|---|
| DE | 4129633 A1 * | 5/1992 |
| DE | 102005004899 A1 | 8/2006 |
| JP | 2004220933 A | 8/2004 |
| JP | 2010201481 A | 9/2010 |
| JP | 2012152792 A | 8/2012 |

* cited by examiner

PRIOR ART

Fig. 6

ULTRASOUND WELDING DEVICE AND METHOD FOR WELDING ELECTRICAL CONDUCTORS

This application is a 371 of PCT/EP2013/075295, filed on Dec. 3, 2013, which claims priority to German Application No. 102012111734.9 filed Dec. 3, 2012.

The invention relates to an ultrasonic welding device for welding electrical conductors such as stranded wires for producing a node between the conductors, comprising a compression space for receiving the conductors that is delimited on the circumferential side by two working surfaces delimiting the compression space on opposite sides and by two lateral delimiting surfaces running transversely to the working surface, and in which the remaining sides are open, wherein one of the working surfaces is a section of a sonotrode of the ultrasonic welding device which sonotrode can be excited into ultrasonic oscillations and wherein the other working surface is a section of a counterelectrode, and at least the working surfaces are structured, wherein in at least one, preferably in both exit areas of the compression space the working surface of the counterelectrode comprises an elevation which runs transversely to the longitudinal axis of the compression space extending through the open sides, is arc-shaped in section and extends in the direction of the working surface of the sonotrode.

The invention also relates to a method for welding electrical conductors such as stranded wires to a node in a compression space of an ultrasonic welding device, which space can be adjusted in its height and its width, wherein the compression space is delimited on the circumferential side by two working surfaces delimiting the compression space on opposite sides and by two lateral delimiting surfaces running transversely to the working surfaces with remaining open sides, wherein one working surface is a section of a sonotrode that can be excited into ultrasonic oscillations and the other working surface is a section of a counterelectrode, and at least the working surfaces are structured, wherein in at least one exit area of the compression space an elevation running transversely to the longitudinal direction of the compression space and arc-shaped in section projects from the working surface of the counterelectrode by means of which elevation the welding of the conductors running in the area of the counterelectrode is reinforced.

Plastics as well as metals can be welded with ultrasound. In the ultrasonic welding of metals the mechanical oscillations are directed parallel to the joint surface. A complex relationship develops between static force, the oscillating shearing forces and a moderate temperature rise in the welding zone. To this end the work pieces are arranged between the oscillating sonotrode and a static counterelectrode that can be optionally adjusted relative to the sonotrode and which can be constructed in several parts in order to delimit a compression space with the sonotrode, i.e., a working surface of its head. This space can be adjustably constructed according to the teachings of EP 0 143 936 B1 (U.S. Pat. No. 4,596,352 A1) or DE 35 08 122 C2 in two directions running at right angles to each other, in particular height and width. This results in an adaptation to cross sections of, for example, conductors to be welded.

In the known compression space comprising a substantially rectangular cross-section stranded wires running through the compression space in its open sides are welded by ultrasound to through nodes or end nodes.

In order to ensure that the stranded wires are welded over the entire length of the compression space an elevation following a corrugated section and extending in the direction of the sonotrode, that is, its working surface is constructed in the working surface of the counterelectrode, that is also designated as anvil, for reinforcing the welding in the exit areas of the compression space, that is, in the area of the open sides. The particular corresponding elevation basically has an arced geometry in section and can follow the course of a section of a sinusoidal curve. It is disadvantageous that the conductors running in the area of the elevation on the sonotrode side, that is, those conductors that are in contact with the working surface of the sonotrode oscillation in the longitudinal direction of the conductors are heavily loaded, that could as a result lead to a node being evaluated as a poor welding.

Furthermore, it is provided in known arrangements that the working surface of the counterelectrode comprises in the central area a projection projecting over the structure that is otherwise present in the working surface in order to carry out a reinforced welding in the central area. However, the elevation extending over the entire width of the working surface is disadvantageous if conductors are welded to nodes with cross sections of 0.2 $mm^2$ to 1.5 $mm^2$ since in this case the projecting projection can have a cutting action with the consequence that the node can break.

U.S. Pat. No. 0,169,388 A1 relates to an ultrasonic welding device with which film-like electrodes are welded. The ultrasonic welding device comprises an anvil and a sonotrode head without lateral delimitation elements being present. In order to reduce the material loads on the structural components to be welded, in particular the electrodes consisting of aluminum, it is provided that the welding surfaces of anvil and sonotrode head, that comprise elevations, have a lesser height in the central range, whereby the projections of anvil and sonotrode head are equal.

The present invention has the task of further developing an ultrasonic welding device and a method for welding in particular stranded wires in such a manner that a high-strength node is available over the entire length of the conductors running in the compression space without undesirable loads occurring either in the area of the nodal ends or during the welding of conductors to nodes with a low cross section and/or low width.

In order to solve one of the aspects the invention provides that the working surface of the sonotrode comprises at least one recess running at least in sections along the elevation in its area running in a projection of the elevation of the counterelectrode in the direction of the plane tensioned by the working surface of the sonotrode.

The invention provides that a recess extending along the elevation is formed opposite the elevation of the anvil working surface in the sonotrode working surface which elevation runs in the area of the exit area, that is, the open side of the compression space. The projection of the elevation of the counterelectrode in the direction of the sonotrode should cover the recess during the welding. If no stranded wires are present between the working surfaces and the welding surfaces of anvil and sonotrode, then the elevation—also to be designated as a projection, in particular a curved projection—covers the recess. As a result of the fact that no direct contact of the conductors with the working surface of the sonotrode occurs in the area of the recess the introduction of oscillation energy is reduced with the result that the load is reduced. Regardless of this, however, the desired welding take place in the area of the conductors running on the anvil side, especially since a reinforcement of the welding of the stranded wires running an the anvil side takes place by the elevations.

Based on the teaching of the invention, on the one hand it is ensured by the elevation that the conductors lying in this area are well-welded so that a node has the required strength up to its exit. At the same time the stranded wires and their wires that run opposite the elevation of the counterelectrode along the sonotrode are protected by the recess.

In particular, it is provided that the recess is constructed in such a manner that at least one delimitation of the recess running transversely to the longitudinal axis of the compression space acts as a wall protection against an axial shifting of conductors resting on the delimitation.

Therefore, the recess has a double function, namely, that of protecting the conductors that are most heavily stressed according to the prior art in the area of the sonotrode and on the other hand of preventing a migration of the conductors in their longitudinal direction.

In particular, it is provided that each of the lateral delimitations of the recess acts as a wall protection.

The recess preferably has a geometry that is U-shaped, semicircular or V-shaped in its section.

If a recess is preferably associated with each elevation that runs starting in the exit area of the compression space from the working surface of the anvil and transversely to the longitudinal axis of the compression space, then there is also the possibility that at least two recesses running along the elevation are provided in the area of the projection of the elevation.

If only one recess is associated with an elevation then they should be aligned in such a manner toward the elevation that the recess runs during the welding of the conductors along the central area of the elevation.

An ultrasonic welding device in which the working surface of the counterelectrode starts from a slide that can be adjusted parallel to the working surface of the sonotrode, which slide for its part starts from a carrier that can be adjusted vertically to the working surface of the sonotrode and that indirectly or directly laterally delimits the compression space, and wherein at least the working surface of the counterelectrode has a structure that is preferably formed by successive elevations and recesses running transversely to the longitudinal axis of the compression space, wherein at least one elevation projects in the central area of the working surface of the compressor above the other elevations in the direction of the sonotrode is distinguished according to the invention in that the at least one elevation running in the central area and starting from the free edge of the working surface of the counterelectrode, which edge runs in the longitudinal direction of the compression space, is shortened in its height over an area in such a manner that the crown area of the area facing the working surface of the sonotrode runs in or approximately in a plane or offset from the plane that is tensioned by the other elevations or, in the case of a lack of other elevations, by the working surface, wherein the area comprises a length L running transversely to the longitudinal axis of the compression space which length is shorter than possible extensions of the working surface transversely to the longitudinal axis of the compression space.

Based on the teaching of the invention, there is the possibility of welding conductors and/or stranded wires with different cross section with one and the same ultrasonic welding device without there being a danger in the case of conductors with small cross sections or nodes with a small width that the projection extending from the working surface of the anvil exercises a notch effect on the stranded wires in such a manner that a break is possible.

In particular, it is provided that the length L is 0.5 mm≤ L≤1.5 mm, in particular L≈1 mm.

A method of the initially cited type is distinguished in that conductors resting opposite the elevation of the counterelectrode and on the sonotrode or running in this area are less strongly welded in comparison to the welding that took place at least in the central area of the compression space and are at least inhibited from an axial movement in that a recess running in the direction of the working surface of the sonotrode at least in sections in the working surface of the sonotrode and along the elevation is formed as a projection of the elevation, wherein at least one of the delimitations running transversely to the longitudinal axis of the compression space at least inhibits the axial movement of the conductors resting at least on the delimitation.

According to the invention a welding of conductors to nodes takes place—whether they are end nodes or through nodes—in such a manner that the required welding of the conductors takes place even on the anvil side in the exit areas of the compression space and at the same time in the areas of the sonotrode the conductors are "protected" in which according to the prior art amplified oscillation energy is introduced, namely, in those in which projections that are arc-shaped in section area run in the exit areas of the compression space and over the working surface of the counterelectrode. At the same time the recess acts like a wall protection in such a manner that the interaction of the conductors with at least one of the delimitations of the recess, which runs transversely to the longitudinal axis of the compression space, eliminates or at least inhibits an axial shifting of the conductors.

A method using a counterelectrode whose working surface starts from a slide that can be adjusted parallel to the working surface of the sonotrode and which slide for its part starts from a carrier that can be adjusted vertically to the working surface of the sonotrode and by which the compression space is indirectly or directly laterally delimited, wherein at least the working surface of the counterelectrode is provided with a structure formed by successive elevations and recesses running transversely to the longitudinal axis of the compression space, wherein at least one of the elevations projects over the other ones in the direction of the sonotrode in the central area of the working surface, is furthermore distinguished in that the at least one elevation running in the central area of the working surface and starting from the free edge of the working surface which edge runs in the longitudinal of the compression space is shortened over an area B with a length L vertically to the longitudinal axis of the compression space in such a manner that the crown area of the shortened area B, which crown area faces the working surface of the sonotrode, runs in or approximately in a plane or offset from the plane that is tensioned by the other elevations, and that either the maximum width of the compression space is adjusted to the length of the area of the shortened elevation or a width is adjusted that is wider than the length as a function of the cross section of the conductors to be welded.

Consequently, there is the possibility of using the same delimitation elements of a compression space for conductors with different cross sections without the danger in the case of small cross sections that the projection required for large cross sections and projecting in the central area of the working surface of the sonotrode adversely affects the welding result by notching the projection into the conductors but rather in the case of small cross sections the compression space is designed in its width in such a manner that the projection running in the central area runs outside of the compression space.

Of course, the invention is not departed from if the working surface of the anvil has another structure than the previously described one or only the projection running in the central area, which is shortened in height in accordance with the invention.

Other details, advantages and features of the invention result not only from the claims, the features to be gathered from them—either alone and/or in combination—, but also from the following description of preferred exemplary embodiments to be gathered from the drawings.

In the drawings.

The invention is explained in the following using basic views, wherein basically the same reference numerals are used for the same elements.

Figure 1:
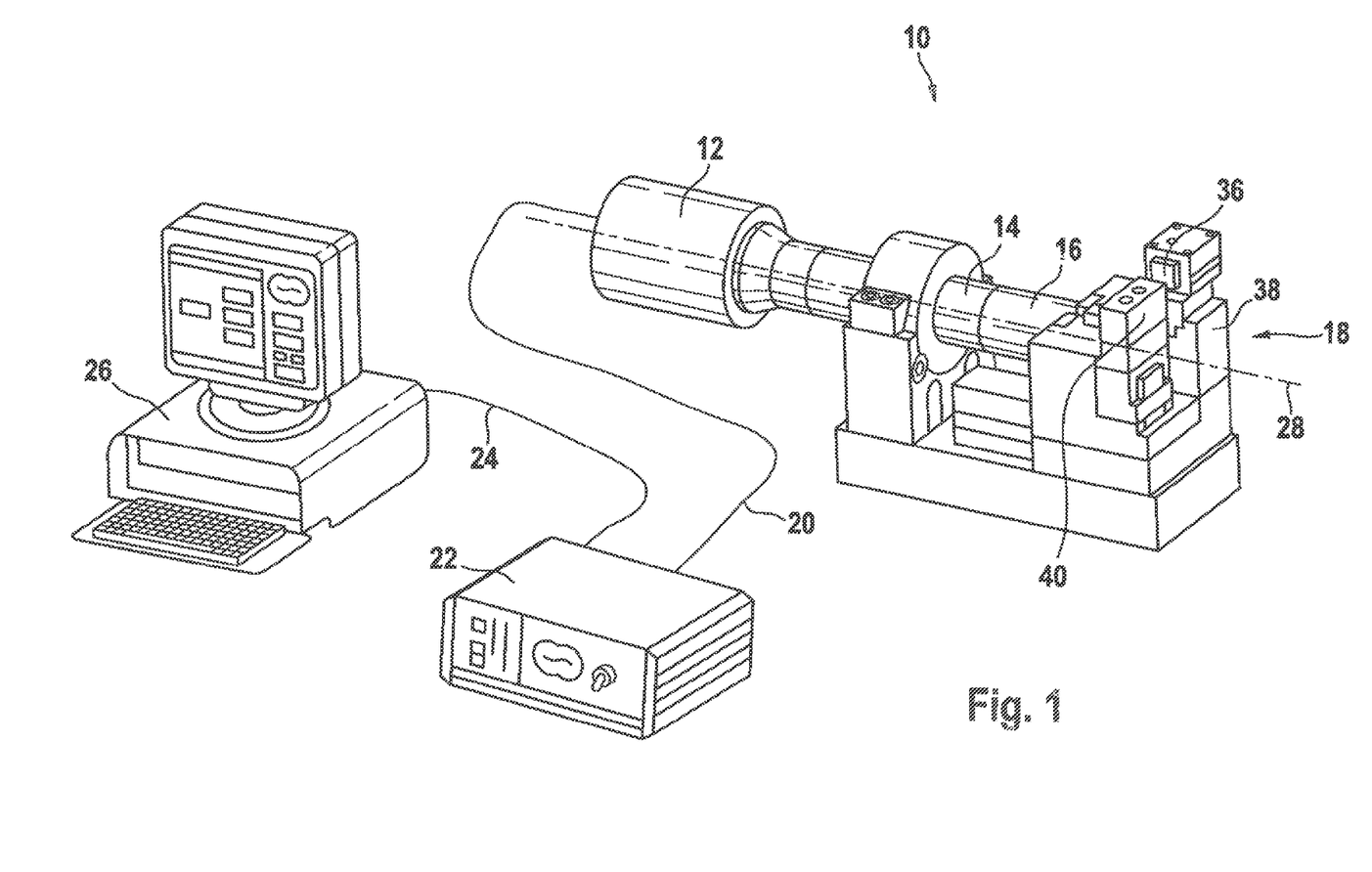
FIG. 1 Shows a basic view of an ultrasonic welding device.

FIG. 1 shows an ultrasonic welding device in a purely basic manner with which metallic parts in the shape of stranded wires are to be welded to each other. The ultrasonic welding device comprises an oscillator 10 consisting in the exemplary embodiment of a converter 12, a booster 14 and a sonotrode 16. The sonotrode 16 the limits a compression space 18 to be explained in detail in the following. A basic construction of an appropriate compression space can be gathered, for example, from U.S. Pat. No. 4,869,419 A1.

Figure 2A:
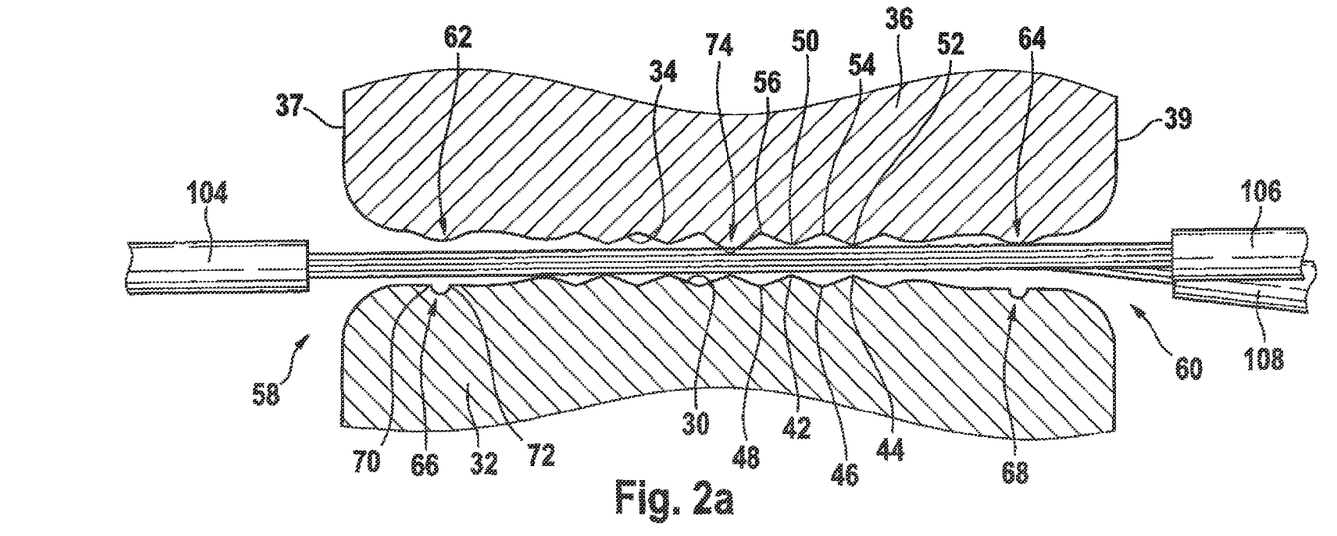
FIG. 2*a* Shows a section of a compression space of the ultrasonic welding device according to FIG. 1 in section, FIG. 2*b, c* Show details of the section according to FIG. 2*a*, FIG. 3 Shows a perspective view of a section of an ultrasonic welding device basically corresponding to FIG. 1, FIG. 4*a, b* Show views of stranded wire nodes on the counterelectrode side, FIG. 5 Shows a section of anvil and sonotrode according to the prior art, and FIG. 6 Shows a section of anvil and sonotrode according to the invention and corresponding to FIG. 5.

In the view according to FIG. 2*a* sonotrode 16 and therefore the sonotrode head 32 oscillate horizontally in the plane of the drawing and parallel to the longitudinal edge of the drawing sheet. A counterelectrode associated with the sonotrode 16—which counterelectrode is also called anvil 36 in the following—can be adjusted vertically to the drawing plane and relative to the sonotrode 16.

The converter 12 is connected in a known manner via a line 20 to a generator 22 which for its part is connected via a line 24 to a computer 26 by which the generator 22 is controlled in order to then convert electrical oscillations into mechanical oscillations by the converter 12 via, for example, by piezoelements, wherein the oscillations are amplified by the booster 14 in order to then appropriately excite the sonotrode 16.

Figure 4A:
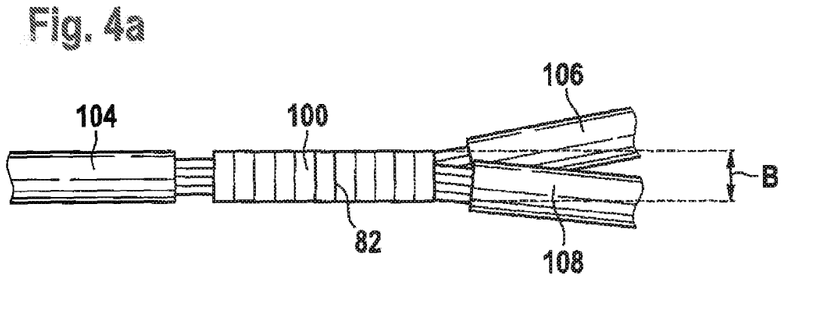
Figure 4B:
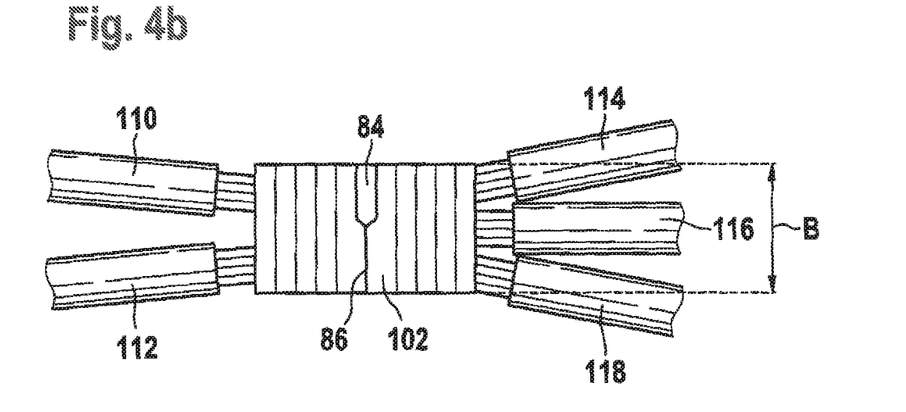

The compression space 18 has a rectangular geometry in cross section and is open on the front side. Stranded wires are introduced through the front side into the compression space for them to be welded to a node, as can be gathered, for example, from FIG. 4 and which are characterized by the reference numerals 100, 102. The compression space 18, which runs in the longitudinal direction of the sonotrode axis 28 and therefore in the direction of the oscillation of the sonotrode 16 and in the axial direction of stranded wires 104, 106, 108, 110, 112, 114, 116, 118 to be introduced into the compression space 18, is delimited on opposite sides on the one hand by a working surface 30 of the sonotrode 16 and its sonotrode head 32 and on the other hand by a working surface 34 of the counterelectrode or of the anvil 36. The anvil 36 starts from a carrier 38 which can be adjusted vertically to the working surfaces 30, 34, which anvil can be shifted parallel to the working surface or welding surface 30 of the sonotrode 16 or of the sonotrode head 32. Refer for this to known constructions.

In order to eliminate a migration during the excited sonotrode 16 when welding the stranded wires 104, 106, 108 and 110, 112, 114, 116, 118, the working surfaces 30, 34 have a corrugated or sawtooth-like structure, wherein elevations 42, 44 and notches and recesses or channels 46, 48 of the working surface 30 of the sonotrode head 32 and elevations 50, 52 and recesses or channels 54, 56 of the anvil 36 alternate in accordance with the sectional view according to FIG. 2*a*. The structure formed in this manner runs vertically to the longitudinal axis of the stranded wires 104, 106, 108, 110, 112, 114, 116, 118 and therefore vertically to the longitudinal axis of the compression space 18 and therefore of the sonotrode 16.

In order to weld the stranded wires 104, 106, 108 running on the anvil side and their wires to the required extent even in the exit areas 58, 60 of the compression space 18, that is, in the edge areas of the working surfaces 30, 34 which edge areas run vertically to the longitudinal axis 28 and to therefore ensure the desired strength, elevations 62, 64, that are arc-shaped in section and project in the direction of the sonotrode 16 and of the sonotrode head 32, extend in the longitudinal edge areas running transversely to the longitudinal axis of the compression space 18, that is, in the exit areas 58, 60 so that the stranded wires 104, 106, 108 are welded to the required extent to the particular node exit, that is, to the edge area of the compression space 18. These projections 62, 64, that are also to be designated as corrugations, belong to the prior art.

Figure 5:
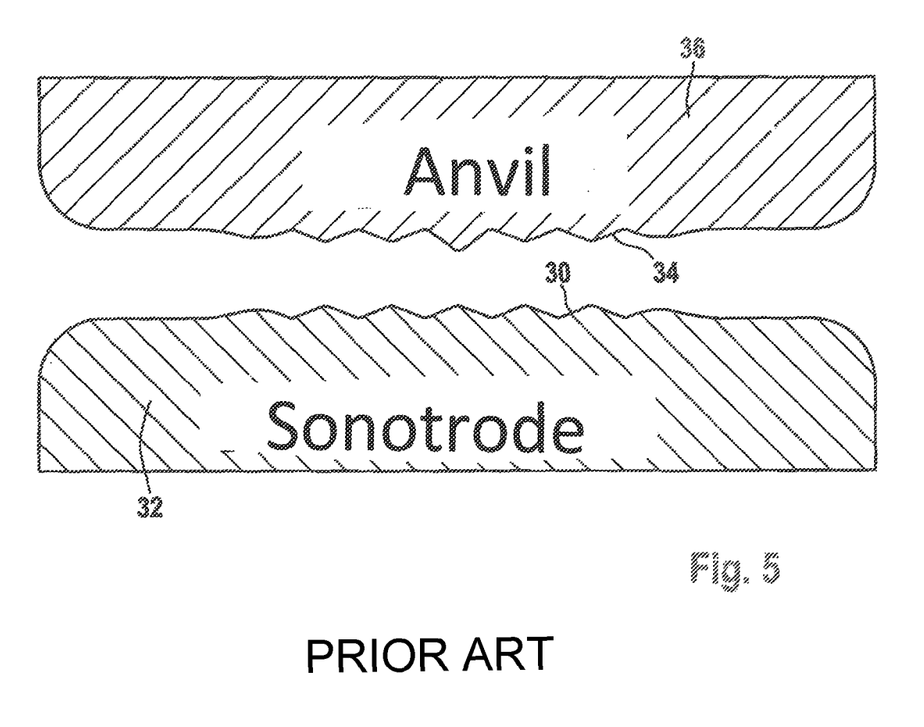

A section of a compression space in the area of the anvil and the sonotrodes can be gathered from FIG. 5. It is possible to recognize the structuring of the working surfaces 30, 34 of the anvil 36 and of the sonotrode head 32, which structuring is shaped like a saw in section. In the view of FIG. 5 the working surface 34 of the anvil 36 as well as that of the sonotrode head 32 are constructed plane in the exit area. However, geometries also results in which a section is provided with an elevation in the anvil surface in the exit area, as can be gathered from FIG. 2*a* and is characterized by the reference numerals 62, 64. According to the prior art the surface of the sonotrode head 32 opposite the elevations also has elevations. As a result, the stranded wires running along the working surface of the sonotrode head 32 are heavily loaded.

In order to protect the heavily loaded stranded wires 104, 106, 108 on the opposite side, that is, on the working surface 30 of the sonotrode head 32, at least one recess 66, 68 that can have a semicircular shaped, U shaped or V shaped geometry runs in the area of the projections 62, 64 of the anvil 36 and opposite to the latter in the working surface or welding surface 30 of the sonotrode 16 and/or of the sonotrode head 32. In the drawing view of FIG. 2*a*, 2*c* a semicircular geometry is selected. The recesses 66, 68 run in the projection of the projections 62, 64 in the direction of the working surface 30 of the sonotrode head 32. To this extent the drawings are self-explanatory.

If a projection 62, 64 of the anvil 36 is associated with only one recess 66, 68 running along the latter in the working surface 30 of the sonotrode head 32, then several corresponding recesses can also be provided in the working surface or welding surface 30 of the sonotrode head 32. If necessary, it is also possible that only one of the projections 62, 64 is associated with a corresponding recess 66, 68.

The areas of the stranded wires 104, 106, 108 that are otherwise loaded the heaviest on account of the projections 62, 64 are protected by the notches 66, 68 or recesses.

Figure 2B:
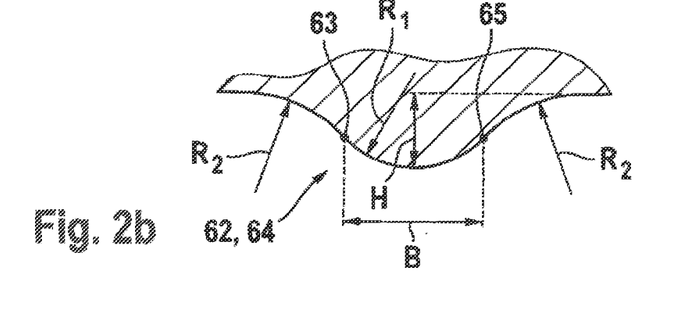

The following is to be noted regarding the elevations 62, 64 that are in the working surface 34 of the anvil 36 and run in the exit areas 58, 60. As the enlarged view of the elevation 64 in fig. illustrates, the elevation 62, 64 has a height H between 0.2 mm and 2 mm opposite the immediately adjacent, deepest areas in the working surface 34. The width B of the elevation is between 0.2 mm and 2 mm, namely between the turning points 63 and 65, that is, the transition of the elevation 62, 64 to the particular adjacent valley, that is also limited by a curved section. The distance B consequently results from the transition of the radius $R_1$ of the elevation 62, 64 to the radii $R_2$ of the adjacent valleys. The radius $R_1$ of the elevation 62, 64 is preferably between 0.1 mm and 1 mm. The radii $R_2$ of the adjacent valleys should be between 0.1 mm and 1.5 mm.

Figure 2C:
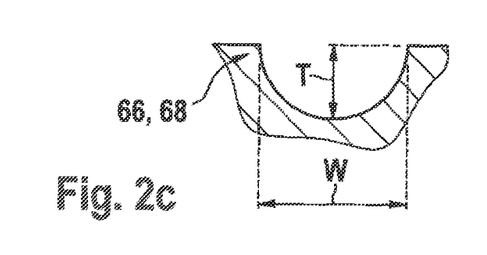

FIG. 2c shows a purely basic enlarged view of the notch 66, 68—also called recess. The latter has a depth T between 0.02 mm and 0.2 mm. The width or wideness W of the recess 66, 68 is between 0.2 mm and 2 mm.

Even if the elevation 62, 64 and the notch or recess 66, 68 can have the same dimensions, it is preferably provided that the dimension of the elevation 62, 64 is adapted to that of the recess 66, 68 in such a manner that the projection of the elevation 62, 64 in the direction of the working surface 30 of the sonotrode 32 is greater in the longitudinal direction of the compression space, that is, the longitudinal axis 28 of the sonotrode 16 than the width or wideness W of the recess 66, 68.

The distance of the elevation or of the projection 62, 64 from front surfaces 37, 39 of the anvil that run vertically to the longitudinal axis of the compression space should be in the range between 1 mm and 3 mm.

Independently of the above, another advantage can be achieved by the recesses 66, 68. Thus, the edges delimiting the recesses 66, 68 of which those of the recess 66 are provided with the reference numerals 70, 72 act quasi as a brake against an axial shifting of the stranded wires 104, 106, 108 and of their wires, which rest on the working surface 30. In other words, a protection against migration is offered. An axial hold is given without the wires being constricted or cut off.

It is known according to the prior art that the structure of the working surface 34 of the anvil 36 can be shaped in such a manner that a projection 74 is provided in the central area which projects over a plane set by the other projections of the working surface 34, that is, it extends above them, and can basically be gathered from the FIG. 2a.

Figure 3:
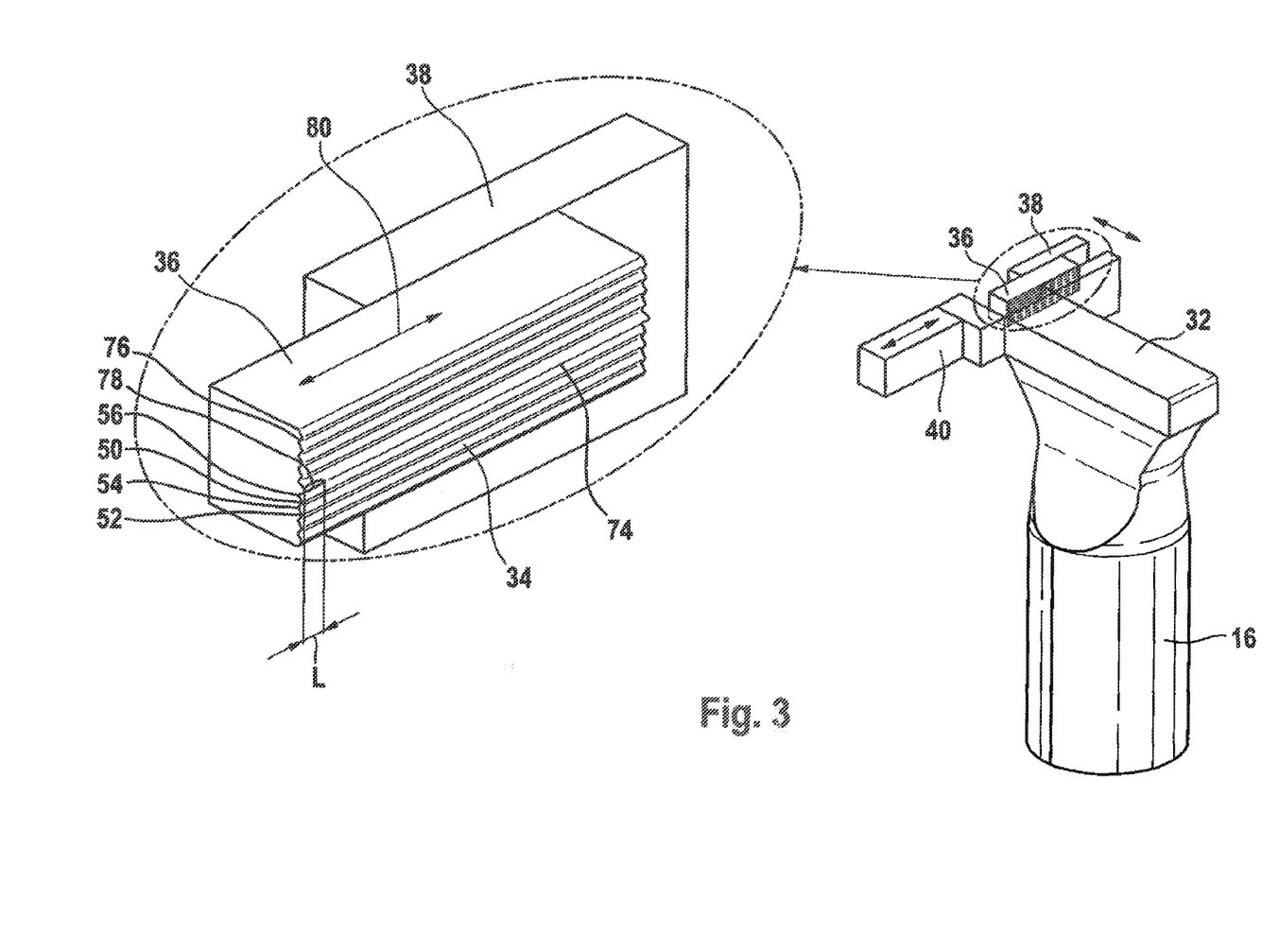

In order to weld stranded wires 104, 106, 108 with rather small cross sections in the compression space 18 regardless of the above, that is, in particular stranded wires that are welded to nodes whose width is less than 1 mm without the projection 74 being able to result in a notching and with it the danger of a breaking of the node 100, it is provided according to the invention that the projection 74, starting from its edge 76, is constructed flattened or reduced in size or as an appropriately shorter elevation in the working surface 34, as can be basically gathered from FIG. 3.

The flattened area of the projection 74 is characterized by the reference numeral 78 and has a length between 0.5 mm and 1.5 mm, in particular in the range of 1 mm transversely or vertically to the longitudinal axis 28 of the compression space 18. As a result, there is the possibility of welding nodes with widths up to 1.5 mm without the projection 74 having an effect and therefore being able to exert a notching action.

The area 78, in which the elevation 74 has a smaller height than in the remaining area, has quasi a plateau and/or a crown surface that stretch(es) along and preferably parallel to the plane set by the working surface 34 of the anvil 36.

It can be recognized from the "anvil views" of the FIG. 4a, 4b of the nodes 100, 102 that when a node—in the present case the node 100—is welded in the compression space 18 during which the projection 74 runs outside of the compression space 18 on account of the withdrawing of the anvil 36 (arrow 80), an area 82 is impressed that corresponds to the reduced-in-size area 78. In the case of rather wide nodes in which the projection 74 cooperates, a correspondingly flattened area 84, which then merges into a recess 86, results which recess is impressed by the projection 74. This can be recognized by the view of the node 102.

Figure 6:
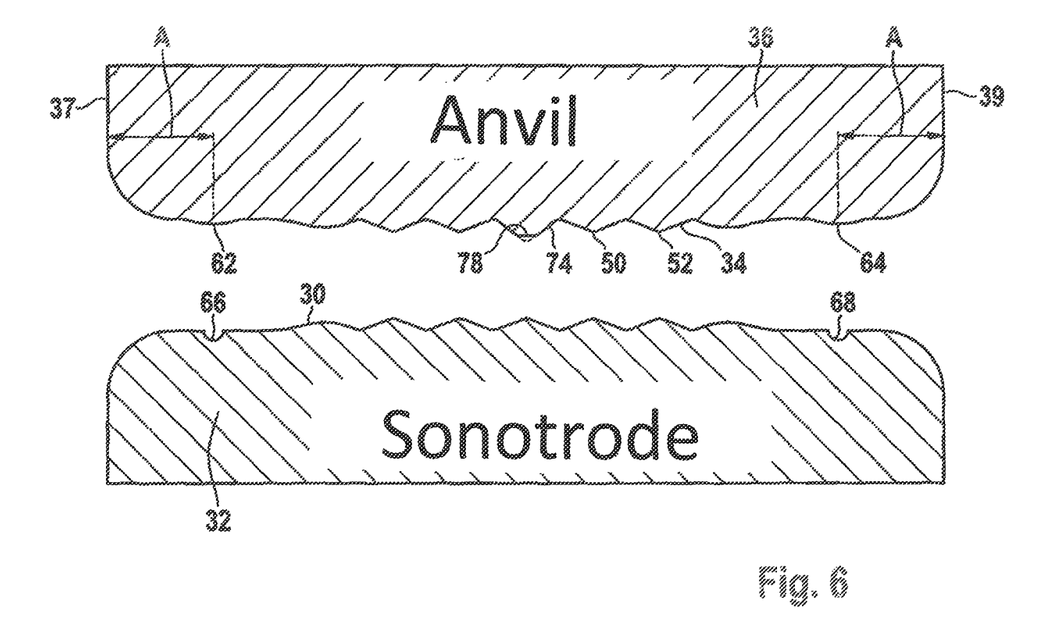

FIG. 6 shows a section of anvil 36 and sonotrode head 32 corresponding to FIG. 5, wherein the anvil 36 and the sonotrode head 32 are shaped according to the teaching of the invention. The groove-shaped recesses 66, 68 in the working surface 30 of the sonotrode head 32 which are associated with the elevations 62, 64 in the working surface 34 of the anvil 36 can be clearly recognized. It is furthermore apparent that the projection or the elevation 74 of the working surface 34 of the anvil 36, which projection runs in the central area and projects over the other elevations or projections 50, 52, is flattened in areas so that a set-back area is available that is formed by a plateau 78 or a flattened area and interacts with stranded wires with a small cross section that are welded to nodes with a smaller width, as was explained using the FIG. 4a, 4b.

The dimensions of the invention for the working surface of the counterelectrode and of the sonotrode can be used for all ultrasonic devices, in particular those that are completely profiled on the circumferential side, as can be seen from EP 1 853 404 B1. The same applies for a use with a sonotrode in accordance with EP 1 680 254 B1. To this extent express reference is made to the corresponding disclosures.

The invention claimed is:

1. An ultrasonic welding device for welding an electrical conductor, the device comprising:
   a compression space having a longitudinal axis and being configured to receive the electrical conductor;
   wherein the compression space is delimited longitudinally by opposing first and second working surfaces;
   wherein the compression space is delimited laterally by first and second lateral surfaces disposed transversely to the first and second working surfaces;
   wherein a side of the compression space is open;
   wherein the first working surface is a section of a counter electrode;
   wherein the second working surface is a section of a sonotrode of the ultrasonic welding device;
   wherein the first working surface comprises alternating elevations and recesses;
   wherein the second working surface comprises alternating elevations and recesses;
   wherein the elevations of the first working surface oppose the elevations of the second working surface;
   wherein the recesses of the first working surface oppose the recesses of the second working surface;
   wherein an edge area of the first working surface comprises a projection extending towards the second working surface, said projection running transversely to the longitudinal axis of the compression space; and wherein an edge area of the second working surface comprises a notch, said notch being open in a direction of the first working surface, in an area opposing the projection.

2. The device according to claim 1, wherein the notch comprises an edge running transversely to the longitudinal axis of the compression space; and
   wherein the edge acts as a protection against an axial shifting of the conductors resting on the edge.

3. The device according to claim 2, wherein the edge acts as a wall protection.

4. The device according to claim 1, wherein the notch has, in cross section, a geometry of a member selected from the group consisting of a U-shape, a semicircular shape, and a V-shape.

5. The device according to claim 1, wherein the edge area of the second working surface comprises two notches.

6. The device according to claim 1, wherein a width of the projection is greater than a width of the notch, when viewed in the longitudinal axial direction of the compression space.

7. The device according to claim 1, wherein the notch runs along a central area of the projection when the conductors are welded.

8. The device according to claim 1,
   further comprising a slide associated with the first working surface, the slide being adjustable parallel to the second working surface;
   wherein the slide is associated with a carrier that is adjustable vertically with respect to the second working surface;
   wherein the slide, indirectly or directly, laterally limits the compression space;
   wherein an elevation in a central area of the first working surface projects above other elevations that are present; and
   wherein the elevation projecting above other elevations, and starting from the edge area of the first working surface, is shortened over an area B with a length L, so that a crown area of the area B runs in a plane, or is offset from the plane, that is tensioned by other elevations or, where no other elevations are present, by the working surface.

9. The device according to claim 8, wherein 0.5 mm≤L≤1.5 mm.

10. The device according to claim 8, wherein L is about 1 mm.

11. A method for ultrasonic welding of an electrical conductor, the method comprising:
    providing an ultrasonic welding device having a compression space that can be adjusted in height and in width, the compression space having a longitudinal axis and being configured to receive the electrical conductor;
    wherein the compression space is delimited longitudinally by opposing first and second working surfaces;
    wherein the compression space is delimited laterally by first and second lateral surfaces disposed transversely to the first and second working surfaces;
    wherein a side of the compression space is open;
    wherein the first working surface is a section of a counter electrode;
    wherein the second working surface is a section of a sonotrode of the ultrasonic welding device;
    wherein the first working surface comprises alternating elevations and recesses;
    wherein the second working surface comprises alternating elevations and recesses;
    wherein the elevations of the first working surface oppose the elevations of the second working surface;
    wherein the recesses of the first working surface oppose the recesses of the second working surface;
    wherein an edge area of the first working surface comprises a projection extending towards the second working surface, said projection running transversely to the longitudinal axis of the compression space;
    wherein an edge area of the second working surface comprises a notch, said notch being open in a direction of the first working surface, in an area opposing the projection;
    welding the conductor resting opposite the projection on the first working surface less strongly than in the central area of the first working surface;
    wherein the notch comprises an edge running transversely to the longitudinal axis of the compression space; and
    inhibiting axial shifting of the conductor resting on the edge of the notch.

12. A method for ultrasonic welding of an electrical conductor, the method comprising:
    providing an ultrasonic welding device having:
    a compression space that can be adjusted in height and in width, the compression space having a longitudinal axis and being configured to receive the electrical conductor;
    wherein the compression space is delimited longitudinally by opposing first and second working surfaces;
    wherein the compression space is delimited laterally by first and second lateral surfaces disposed transversely to the first and second working surfaces;
    wherein a side of the compression space is open;
    wherein the first working surface is a section of a counter electrode;
    wherein the second working surface is a section of a sonotrode of the ultrasonic welding device;
    wherein the first working surface comprises alternating elevations and recesses;
    wherein the second working surface comprises alternating elevations and recesses;
    wherein the elevations of the first working surface oppose the elevations of the second working surface;
    wherein the recesses of the first working surface oppose the recesses of the second working surface;
    wherein an edge area of the first working surface comprises a projection extending towards the second working surface, said projection running transversely to the longitudinal axis of the compression space;
    wherein an edge area of the second working surface comprises a notch, said notch being open in a direction of the first working surface, in an area opposing the projection;
    a slide associated with the first working surface, the slide being adjustable parallel to the second working surface;
    wherein the slide is associated with a carrier that is adjustable vertically with respect to the second working surface;
    wherein the slide, indirectly or directly, laterally limits the compression space;
    wherein an elevation in a central area of the first working surface projects above other elevations that are present;
    wherein the elevation projecting above other elevations, and starting from the edge area of the first working surface, is shortened over an area B with a length L, so that a crown area of the area B runs in a plane, or is offset from the plane, that is tensioned by other elevations or, where no other elevations are present, by the working surface;
adjusting a maximum width of the compression space to the length L; or
adjusting a width of the compression space to a width that is wider than the length L.

* * * * *